United States Patent
Robinson

(10) Patent No.: US 12,400,558 B2
(45) Date of Patent: Aug. 26, 2025

(54) CLEANING SYSTEM WITH ON-BOARD USER-TRAINING FUNCTIONALITY

(71) Applicant: Robert S. Robinson, Hamilton, OH (US)

(72) Inventor: Robert S. Robinson, Hamilton, OH (US)

(73) Assignee: Kaivac, Inc., Hamilton, OH (US)

( * ) Notice: Subject to any disclaimer, the term of this patent is extended or adjusted under 35 U.S.C. 154(b) by 937 days.

(21) Appl. No.: 16/460,981

(22) Filed: Jul. 2, 2019

(65) Prior Publication Data

US 2020/0005672 A1    Jan. 2, 2020

Related U.S. Application Data

(60) Provisional application No. 62/693,424, filed on Jul. 2, 2018.

(51) Int. Cl.
| | |
|---|---|
| *G09B 19/24* | (2006.01) |
| *A47L 11/30* | (2006.01) |
| *A47L 11/40* | (2006.01) |
| *B08B 3/02* | (2006.01) |
| *G09B 5/02* | (2006.01) |
| G06F 3/0482 | (2013.01) |
| G06F 3/0488 | (2022.01) |
| G09B 5/06 | (2006.01) |

(52) U.S. Cl.
CPC .............. *G09B 19/24* (2013.01); *A47L 11/30* (2013.01); *A47L 11/40* (2013.01); *B08B 3/026* (2013.01); *G09B 5/02* (2013.01); *G06F 3/0482* (2013.01); *G06F 3/0488* (2013.01); *G09B 5/065* (2013.01)

(58) Field of Classification Search
CPC .......... G09B 19/24; G09B 5/02; A47L 11/40; A47L 11/30; B08B 3/026; G06F 3/0482; G06F 3/0488
See application file for complete search history.

(56) References Cited

U.S. PATENT DOCUMENTS

| | | | |
|---|---|---|---|
| 10,958,081 B1 * | 3/2021 | Ebrahimi Afrouzi | H02J 7/00034 |
| 2013/0141211 A1 * | 6/2013 | Troff | A47L 11/4011 340/5.21 |
| 2016/0334943 A1 * | 11/2016 | Jeon | G06F 3/0481 |
| 2017/0135543 A1 * | 5/2017 | Halloran | A47L 9/2894 |
| 2017/0214423 A1 * | 7/2017 | Park | H04B 1/3818 |
| 2021/0342596 A1 * | 11/2021 | Wang | G06K 9/6217 |

* cited by examiner

*Primary Examiner* — Steve Rowland
(74) *Attorney, Agent, or Firm* — David E. Pritchard

(57) ABSTRACT

A cleaning system with on-board user-training functionality may include: a cleaning machine; an electronic playback device constructed and arranged for user training, with the playback device connected to the cleaning machine; and an electronic storage unit on which one or more items of training information are stored, with the training information relating to training a user in the operation or use of the cleaning machine. In this fashion, a user may select and play training information on the playback device to train the user in the operation or use of the cleaning machine. The playback device may include play, pause, rewind, fast-forward, and stop functions, whereby a user may select an item of training information, play the item, pause or stop play of the item, and practice performing the item on or with the cleaning machine to which the playback device is connected.

21 Claims, 3 Drawing Sheets

CLEANING SYSTEM WITH ON-BOARD USER-TRAINING FUNCTIONALITY

CROSS-REFERENCE TO RELATED APPLICATION

This patent document claims the benefit of the filing date of Provisional Application No. 62/693,424, entitled "System and Method for Training Cleaning Professionals" and filed on Jul. 2, 2018. The entire disclosure of Provisional Application No. 62/693,424 is incorporated into this patent document by reference.

BACKGROUND OF THE INVENTION

This invention relates to commercial and industrial cleaning machines, and to methods and materials for training workers in how to use the machines and how to perform various types of cleaning using the machines.

SUMMARY OF THE INVENTION

One aspect of the invention is directed to an electronic system for providing educational information to a cleaning professional regarding the use of a cleaning machine. The electronic system may include an electronic playback device and educational information playable on the playback device, with the educational information relating to the use of a cleaning machine. In this fashion, a cleaning professional may play the educational information on the playback device to obtain information regarding the use of the cleaning machine.

If desired, the electronic playback device may be audiovisual, user-controlled, menu-driven, interactive, or customizable. Also, if desired, the electronic playback device may be physically connected to a cleaning machine. For example, the device may be mounted directly or indirectly to or on the machine or may be tethered to the machine.

If desired, the educational information may include audio, video, and/or simultaneous audio and video, may be in any suitable electronic format, and may be stored on any suitable storage medium or media. Also, if desired, the educational information may be related: to the use of a cleaning machine, a category of cleaning machines, or a specific cleaning machine make and model (e.g., set up, basic operation, daily and periodic maintenance, troubleshooting, or repair); or to a specific cleaning application (e.g., restroom cleaning, kitchen cleaning, hard surface floor cleaning, or floor care). Also, the educational information may be designed for one or more kinds of users—for example, someone new to the discipline of cleaning, someone unfamiliar with the use of a category or type of cleaning machine or a specific cleaning application, or someone who is a seasoned cleaning professional wanting to further refine or expand their cleaning knowledge, skill, technique, or the like. If desired, the educational information may show experts demonstrating best practices in real-world cleaning scenarios.

Another aspect of the invention is directed to a method of training a cleaning professional—the method including the use of an electronic system in accordance with the principles of the invention. For example, if desired, and depending on the nature of a particular embodiment of the electronic system of the invention, a user may view (e.g., play and watch) an educational video on the electronic playback device, pause or stop the video after a specific procedure or step is demonstrated, and then practice the procedure or step. The user may repeat as necessary in order to master the procedure or step.

BRIEF DESCRIPTION OF THE DRAWINGS

The accompanying drawings, which are incorporated into this patent document and constitute a part of this specification, illustrate embodiments of the invention and, together with the general description of the invention given above, and the detailed description of the drawings given below, serve to explain the principles of the invention.

DETAILED DESCRIPTION OF THE DRAWINGS

Figure 1:
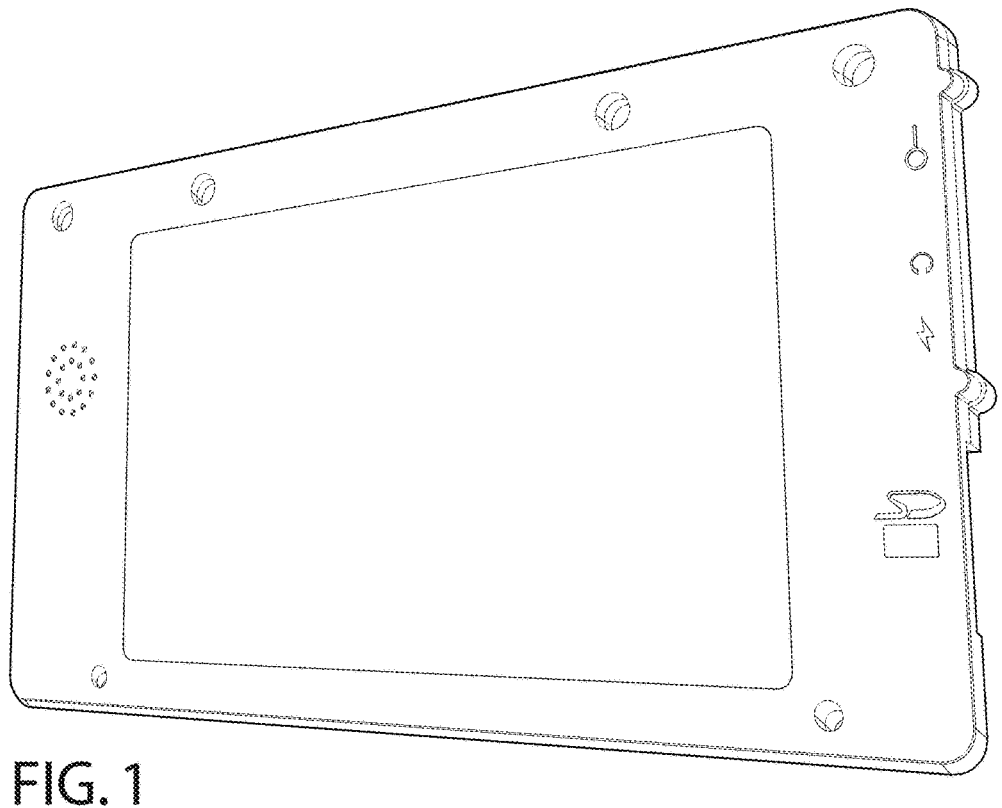
FIG. 1 shows the front of an embodiment of an electronic playback device of the invention, in accordance with the principles of the invention.
Figure 2:
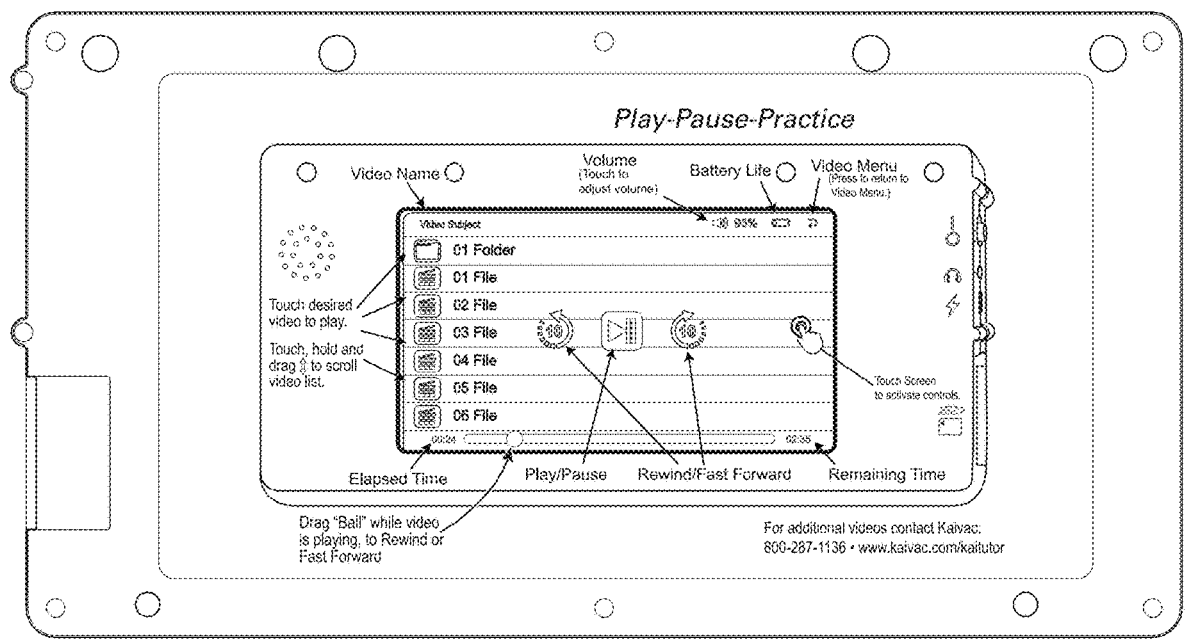
FIG. 2 shows the back of the electronic playback device of FIG. 1.

With reference to FIGS. 1 and 2, an embodiment of an electronic playback device of the invention is shown. The electronic playback device embodiment has an outer housing, an audio-video system that includes a touchscreen video display and an integral sound system (including a speaker), an on/off switch, a headset jack for use with earphones, a rechargeable battery, and a port for use with a power cord for connection to a power source for (re)charging of the battery. The electronic playback device embodiment also has a slot for receiving a micro secure digital ("SD") memory card.

A micro secure digital ("SD") memory card (not shown), also referred to as a micro SD card, that has one or more training videos stored on the card, may be inserted into the micro SD slot of the electronic playback device.

The electronic playback device also has video navigation and volume controls that may be operated by a cleaning professional or other user or worker via the touchscreen video display. For example, and with reference to FIG. 2, a cleaning professional may select a collection of videos or a particular video or video segment from a menu, play a video, pause the video, jump back, jump ahead, select a particular video playback point, adjust the volume, return to a menu, and the like.

Figure 3:
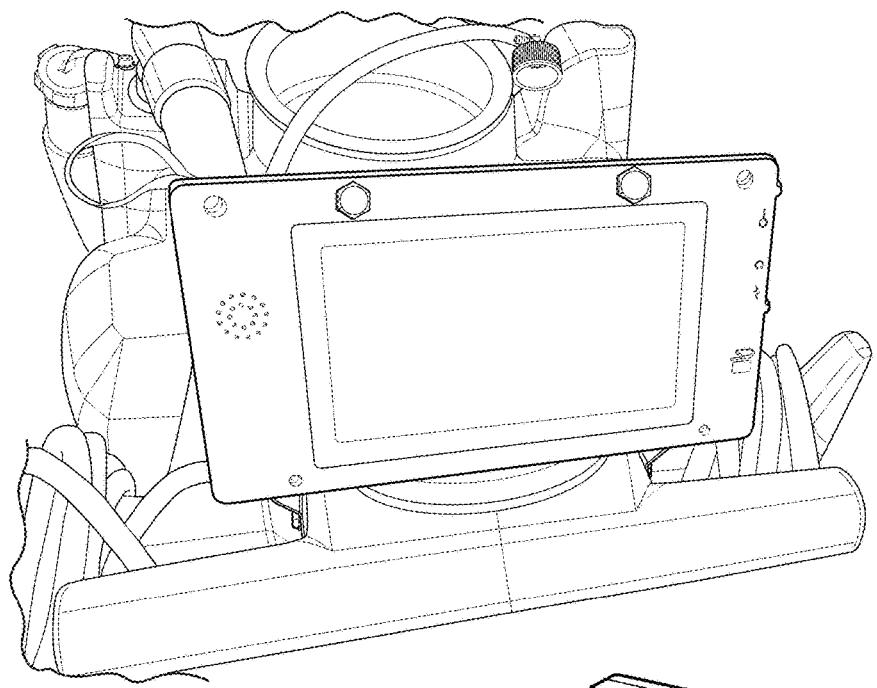
FIG. 3 is a perspective view of the electronic playback device of FIG. 1 connected to a portion of Kaivac No-Touch Cleaning® system, with the playback device in a raised position.
Figure 4:
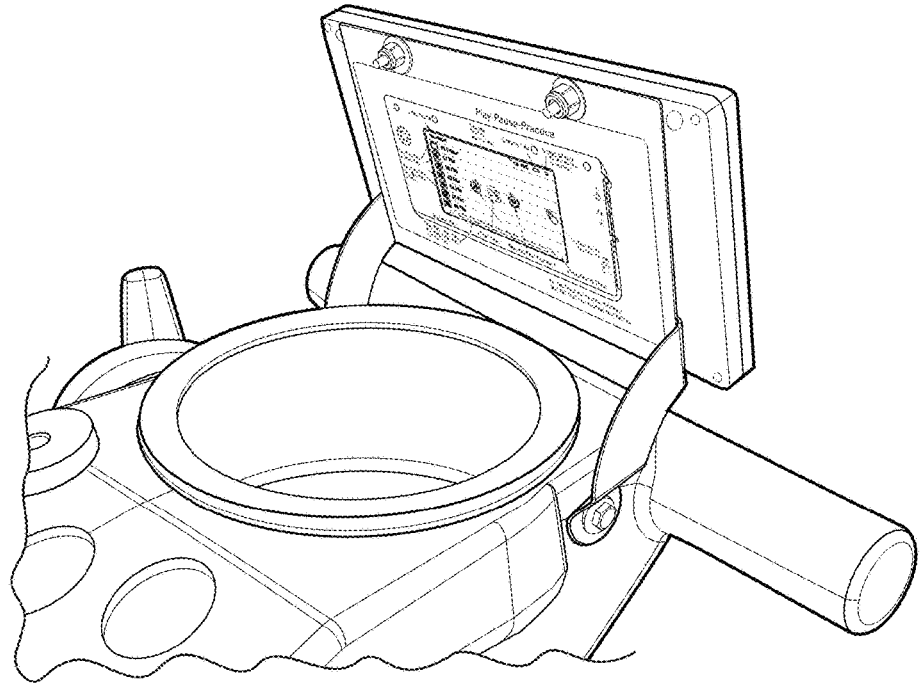
FIG. 4 is a further perspective view of the electronic playback device and portion of the Kaivac. No-Touch Cleaning® system of FIG. 3, with the playback device in a raised position.

With reference to FIGS. 3 and 4, the electronic playback device of FIGS. 1 and 2 is shown connected to a portion of a Kaivac No-Touch Cleaning® system. Kaivac No-Touch Cleaning® systems are commercially available from Kaivac, Inc. of Hamilton, Ohio. The playback device is indirectly connected to the No-Touch Cleaning® system via a bracket. The bracket has a planar plate portion and a pair of arms integrally connected to the plate portion. The arms are perpendicular to the plate portion. The playback device is fastened to the plate portion; and an outer end of each arm is pivotably attached to the No-Touch Cleaning® system. In this fashion, a user may adjust the positioning of the playback device from a raised or upright position to a lowered position.

Figure 5:
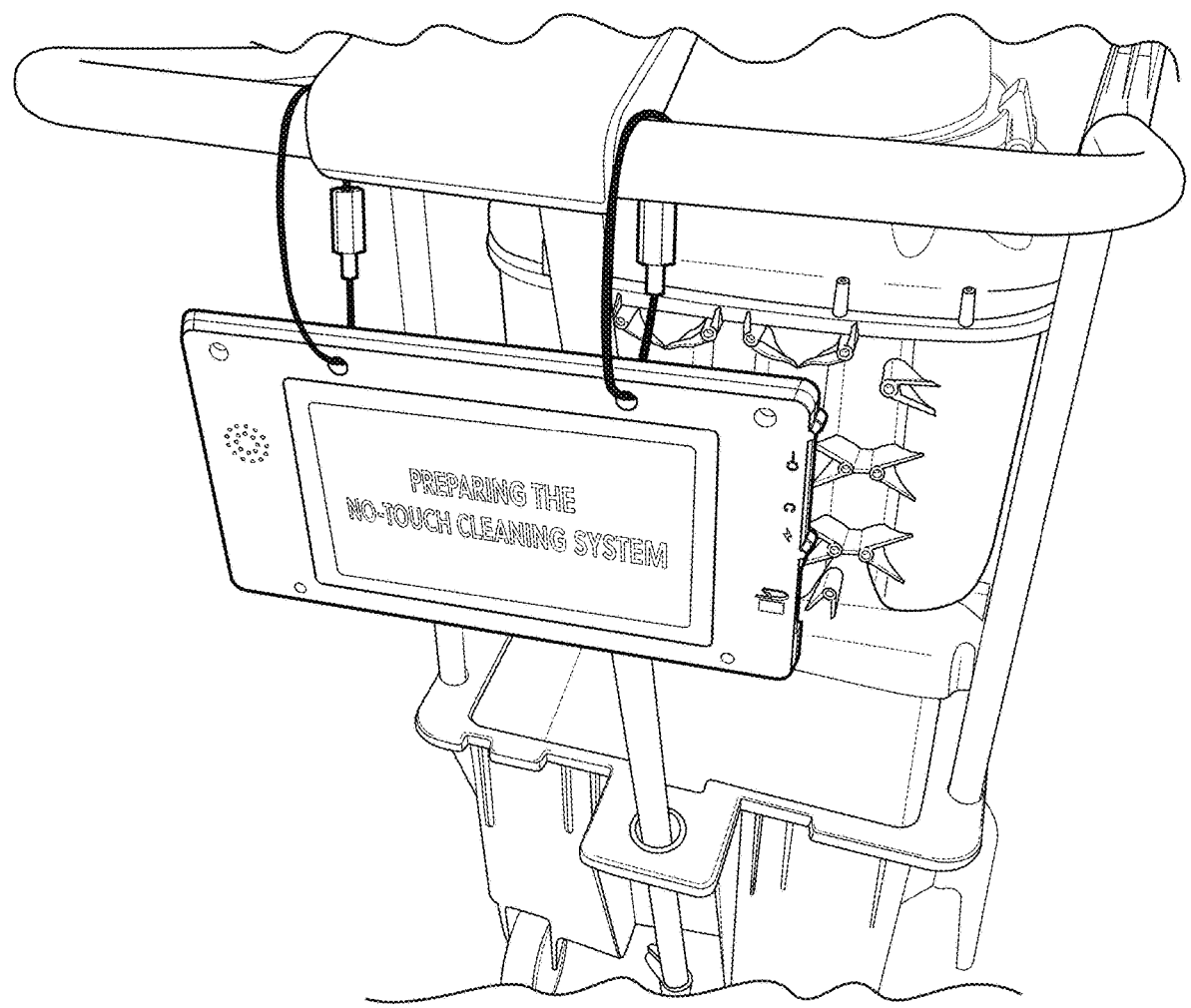
FIG. 5 is a perspective view of the electronic playback device of FIG. 1 connected to a portion of a Kaivac OmniFlex™ system, with a video displayed on the video screen of the playback device.

With reference to FIG. 5, the electronic playback device of FIGS. 1 and 2 is shown connected to a portion of a Kaivac. OmniFlex™ system. Kaivac OmniFlex™ systems are commercially available from Kaivac. Inc. of Hamilton, Ohio. The playback device is indirectly connected to the OmniFlex™ system via a pair of cable ties. In further detail, the electronic playback device of FIGS. 1 and 2 has throughholes, or openings, formed in the upper portion of the playback device outer housing. Each cable tie extends through a corresponding opening of the playback device outer housing, and around a portion of a handle of the Kaivac OmniFlex™ system, such that the playback device is suspended from the handle. In this fashion, the playback device may be used in the suspended position or may be temporarily oriented or held in any of a number of positions, subject to the length and location of the cable ties.

A couple of Kaivac. No-Touch Cleaning® system embodiments are shown and described in detail in U.S. patent application Ser. No. 11/823,131, entitled "Ergonomic Multi-Functional Cleaning Machine" and filed on Jun. 27, 2007. If desired, an electronic playback device of the present invention may be connected to a Kaivac No-Touch Cleaning® system embodiment disclosed in the '131 application. For example, an electronic playback device may be connected to the No-Touch Cleaning® system embodiment handle 90 by a pair of cable ties of the present invention. The entire disclosure of U.S. patent application Ser. No. 11/823,131 is incorporated into this patent document by reference.

Another Kaivac No-Touch Cleaning® system embodiment is shown and described in detail in U.S. patent application Ser. No. 16/152,408, entitled "Portable Cleaning System and Method for Cleaning Commercial Food and Beverage Refrigeration Units" and filed on Oct. 4, 2018. If desired, an electronic playback device of the present invention may be connected to the Kaivac No-Touch Cleaning® system embodiment disclosed in the '408 application. For example, an electronic playback device may be connected to the No-Touch Cleaning® system embodiment handle by a pair of cable ties of the present invention. The entire disclosure of U.S. patent application Ser. No. 16/152,408 is incorporated into this patent document by reference.

A Kaivac OmniFlex™ system embodiment is shown and described in detail in U.S. Pat. No. 9,854,955, entitled "Floor Care System with Interchangeable AC and DC Vacuum Motor Assemblies" and issued on Jan. 2, 2018. If desired, an electronic playback device of the present invention may be connected to the Kaivac OmniFlex™ system embodiment disclosed in the '955 patent. For example, an electronic playback device may be connected to the OmniFlex™ system embodiment handle 14 by a pair of cable ties of the present invention. The entire disclosure of U.S. Pat. No. 9,854,955 is incorporated into this patent document by reference.

Additional Kaivac OmniFlex™ system embodiments are shown and described in detail in U.S. patent application Ser. No. 15/065,832, entitled "Portable Liquid-Recycling Liquid-Reusing Cleaning System for Hard Surface Flooring" and filed on Mar. 10, 2016. If desired, an electronic playback device of the present invention may be connected to any of the Kaivac OmniFlex™ system embodiments disclosed in the '832 application. For example, an electronic playback device may be connected to the handle 14 of any of the OmniFlex™ system embodiments using a pair of cable ties of the present invention. The entire disclosure of U.S. patent application Ser. No. 15/065,832 is incorporated into this patent document by reference.

Another Kaivac OmniFlex™ system embodiment is shown and described in detail in U.S. patent application Ser. No. 15/672,173, entitled "Portable Cleaning and Floor Care System" and filed on Aug. 8, 2017. If desired, an electronic playback device of the present invention may be connected to the Kaivac OmniFlex™ system embodiment disclosed in the '173 application. For example, an electronic playback device may be connected to the OmniFlex™ system embodiment handle 30 by a pair of cable ties of the present invention. The entire disclosure of U.S. patent application Ser. No. 15/672,173 is incorporated into this patent document by reference.

Depending on the particular embodiment, an electronic playback device may be provided with an educational video (e.g., a training video) or collection of educational videos "pre-installed" on the device. For example, if the playback device uses SD memory card technology, the device may be provided with a content-containing SD card already installed in the SD slot of the device. Alternatively, an electronic playback device may be provided without an educational video (e.g., a training video) or collection of educational videos "pre-installed" on the device. In this instance, a content-containing SD card could be made available as a separate item, for placement in the SD slot of the device.

If desired, a collection of videos may be included on a single electronic storage component or unit. For example, in an embodiment in which an electronic playback device uses SD memory card technology, a collection of related videos (e.g., videos relating to the use of a particular type of cleaning machine) may be stored on a single SD card. If desired, a collection of related videos may be referred to as a "library" of videos.

If a user wants to obtain a video or video library they do not yet have, or a user wants to obtain an updated version of a video or video library, the new or updated video content may be transferred to the user via any suitable method—electronic or otherwise. For example, if an electronic playback device uses SD memory card technology, an SD card that contains the new or updated content may simply be mailed to the user.

An electronic system for providing educational information to a cleaning professional, in accordance with the principles of the invention, may be made using any suitable materials and manufacturing methods.

Here are a few examples of embodiments of an SD card that contains a library of machine-related or cleaning-application-related videos:

Kaivac No-Touch Cleaning® System Library SD Card:

Cleaning/Operation: Machine Prep, Set up the Restroom, Inject Chemical, Manually Brush, Pressure Rinse, Loop the Spray Line, Extract and Dry, and Empty and Rinse the System.

Maintenance: Vac-Tank Cleanout, Check Hoses, Wipe Down Machine, Squeegee Blade Inspection, Cold Weather Storage, Release Spray Line Pressure, Lubricating Components, Squeegee Blade Replacement, Inspect HEPA Filter, Squeegee Head Replacement, Inspecting Wheels and Casters, and Black Box Replacement.

Troubleshooting: Chemical Injection, Float Shut Off, Gun Maintenance, Low Pressure, Priming, and Vacuum Troubleshooting.

Kaivac OmniFlex™ AutoVac™ System Library SD Card:

Operation: Setting Up the AutoVac system, Cleaning Floors with the AutoVac system, Emptying the AutoVac system, and Dispense and Vac Operation.

Maintenance: AC-DC Switching, Battery, Microfiber, Squeegee Blades, Trolley Bucket, and Vac Tank Cleanout.

Kaivac OmniFlex™ SUV™ System Library SD Card:

Operation: OmniFlex SUV system Operation, Setting up the SUV system, Restroom Cleaning with the SUV system, Spill Recovery with the SUV system, Vestibule Cleaning with the SUV system, Emptying the SUV system, and SAVES Restroom Cleaning Process.

While the present invention has been illustrated by a description of embodiments, and while the illustrative embodiments have been described in considerable detail, it is not the intention of the inventor to restrict or in any way limit the scope of the invention to such detail. Additional advantages and modifications readily will appear to those skilled in the art upon a reading of this patent document. The invention, in its broader aspects, is therefore not limited to the specific details, representative apparatus and methods, and illustrative examples shown and described in this patent document. Accordingly, departures may be made from such details without departing from the spirit or scope of the inventor's general inventive concept.

What is claimed is:

1. A cleaning system with on-board user-training functionality, comprising:
    a manually propelled cleaning machine;
    an electronic playback device constructed and arranged for user training, the electronic playback device connected to the manually propelled cleaning machine; and
    an electronic storage unit on which one or more items of training information are stored, the training information relating to training a user in the operation or use of the manually propelled cleaning machine,
the electronic playback device operable to play the training information from the electronic storage unit when the electronic storage unit is in electronic communication with the electronic playback device,
    whereby a user may select and play one or more of the items of training information on the electronic playback device to train the user in one or more aspects of the operation or use of the manually propelled cleaning machine.

2. The cleaning system of claim 1 wherein the electronic playback device includes play, pause, rewind, fast-forward, and stop functions, whereby a user may select an item of training information, play the item, pause or stop play of the item, and practice performing the item on or with the manually propelled cleaning machine to which the electronic playback device is connected.

3. The cleaning system of claim 1 wherein the electronic storage unit is removably positionable in the electronic playback device.

4. The cleaning system of claim 3 wherein the electronic storage unit includes a memory card.

5. The cleaning system of claim 4 wherein the memory card is a micro secure digital ("SD") memory card.

6. The cleaning system of claim 1 wherein the electronic playback device is indirectly connected to the manually propelled cleaning machine.

7. The cleaning system of claim 6 wherein the electronic playback device is indirectly connected to the manually propelled cleaning machine by at least one cable tie.

8. The cleaning system of claim 1 wherein the manually propelled cleaning machine includes a fresh liquid tank, a wet vacuum, and a pressure washer.

9. The cleaning system of claim 1 wherein the manually propelled cleaning machine includes a trolley bucket and a wet vacuum.

10. The cleaning system of claim 9 wherein the manually propelled cleaning machine further includes a liquid spreader assembly and a squeegee head assembly, with the squeegee head assembly fluidly connected to the wet vacuum.

11. A cleaning system with on-board user-training functionality, comprising:
    a manually propelled cleaning machine; and
    an electronic playback device constructed and arranged for user training, the electronic playback device connected to the manually propelled cleaning machine,
the electronic playback device operable to play training information from an electronic storage unit on which training information is stored, the training information relating to training a user in the operation or use of the manually propelled cleaning machine,
    whereby when an electronic storage unit on which training information is stored is in electronic communication with the electronic playback device, a user may select and play training information on the electronic playback device to train the user in one or more aspects of the operation or use of the manually propelled cleaning machine.

12. The cleaning system of claim 11 wherein the electronic playback device includes play, pause, rewind, fast-forward, and stop functions, whereby a user may select an item of training information, play the item, pause or stop play of the item, and practice performing the item on or with the manually propelled cleaning machine to which the electronic playback device is connected.

13. The cleaning system of claim 11 further including an electronic storage unit on which training information is stored, the training information relating to training a user in the operation or use of the manually propelled cleaning machine, the electronic storage unit operable for electronic communication with the electronic playback device.

14. The cleaning system of claim 13 wherein the electronic storage unit is removably positionable in the electronic playback device.

15. The cleaning system of claim 14 wherein the electronic storage unit includes a memory card.

16. The cleaning system of claim 15 wherein the memory card is a micro secure digital ("SD") memory card.

17. The cleaning system of claim 11 wherein the electronic playback device is indirectly connected to the manually propelled cleaning machine.

18. The cleaning system of claim 17 wherein the electronic playback device is indirectly connected to the manually propelled cleaning machine by at least one cable tie.

19. The cleaning system of claim 11 wherein the manually propelled cleaning machine includes a fresh liquid tank, a wet vacuum, and a pressure washer.

20. The cleaning system of claim 11 wherein the manually propelled cleaning machine includes a trolley bucket and a wet vacuum.

21. The cleaning system of claim 20 wherein the manually propelled cleaning machine further includes a liquid spreader assembly and a squeegee head assembly, with the squeegee head assembly fluidly connected to the wet vacuum.

* * * * *